United States Patent [19]

Kennerknecht

[11] Patent Number: 5,387,280
[45] Date of Patent: Feb. 7, 1995

[54] CERAMIC CORE FOR INVESTMENT CASTING AND METHOD FOR PREPARATION OF THE SAME

[75] Inventor: Steven Kennerknecht, Laval sur la Lac, Canada

[73] Assignee: Pechiney Recherche, Courbevoie (Hautes de Seine), France

[21] Appl. No.: 182,354

[22] Filed: Jan. 18, 1994

[51] Int. Cl.⁶ .................................. B28B 7/34
[52] U.S. Cl. ...................... 106/38.3; 106/38.9
[58] Field of Search ............... 106/38.3, 38.9; 501/97, 501/98

[56] References Cited

U.S. PATENT DOCUMENTS

| | | | |
|---|---|---|---|
| 4,093,017 | 6/1978 | Miller, Jr. et al. | 106/38.9 X |
| 4,530,722 | 7/1985 | Moore et al. | 106/38.35 |
| 4,690,201 | 9/1987 | Van Rens | 164/516 |
| 4,769,076 | 9/1988 | Watanabe et al. | 106/38.35 |
| 4,837,187 | 6/1989 | Frank et al. | 106/38.9 X |
| 4,921,038 | 5/1990 | Sasaki et al. | 164/516 |
| 4,922,991 | 5/1990 | Pitcher et al. | 164/36 |

*Primary Examiner*—Karl Group
*Attorney, Agent, or Firm*—McFadden, Fincham, Marcus & Anissimoff

[57] ABSTRACT

There is disclosed a core mix and a method of fabricating the core for use in investment casting. The core composition comprises an acid soluble borate binder in a high percentage by weight of the composition. A refractory selected from period three nitride compounds is employed with the binder to impart strength to the core. The use of the combination of binder and refractory as disclosed herein provides a high strength core which is readily soluble by mild environmentally friendly acids.

9 Claims, 7 Drawing Sheets

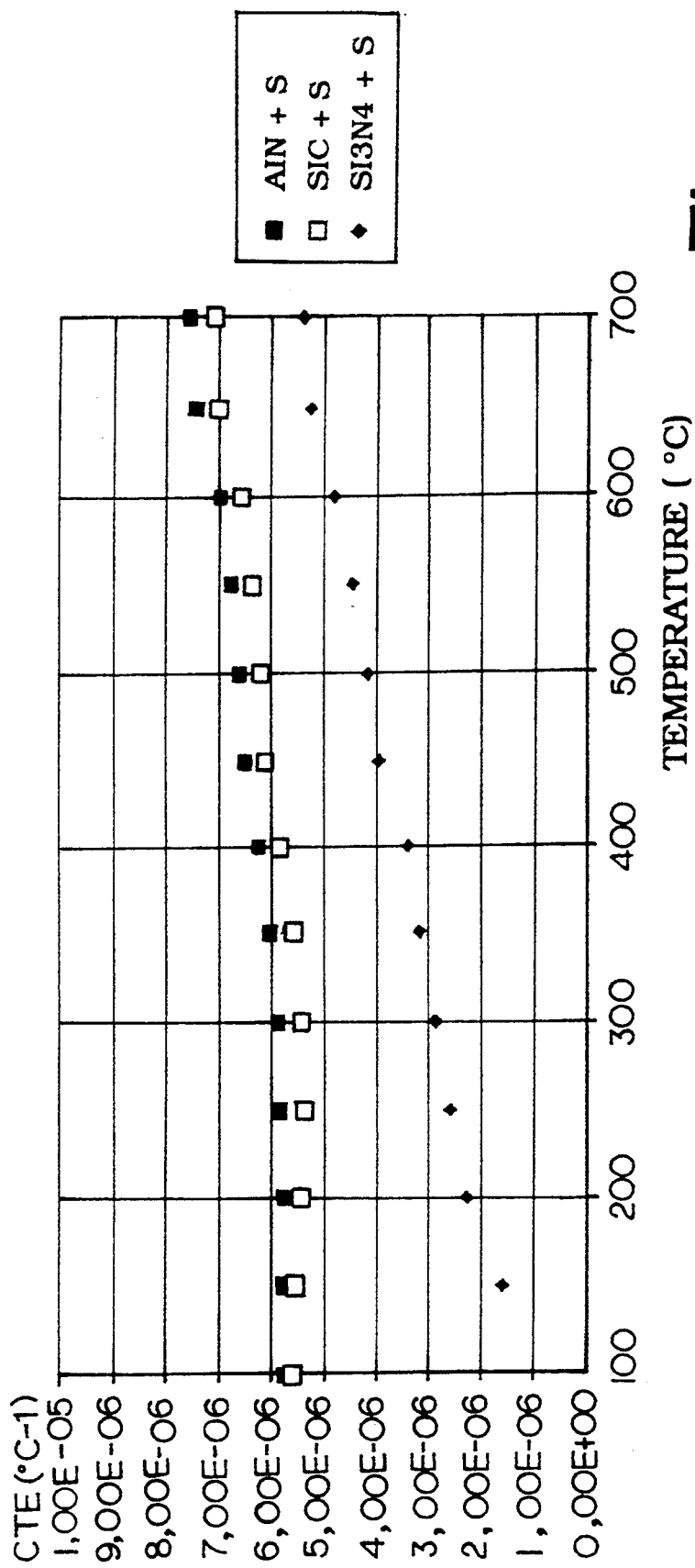

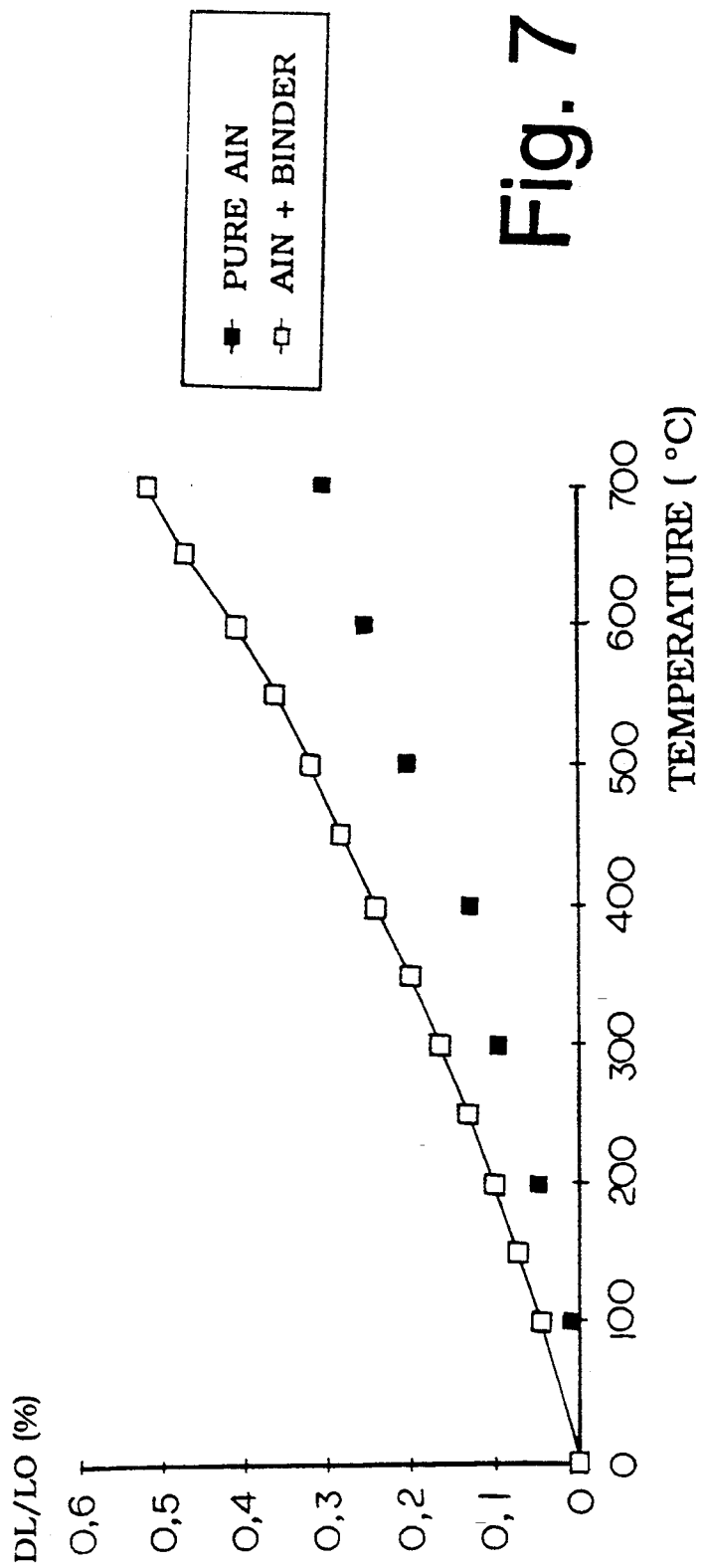

CERAMIC CORE FOR INVESTMENT CASTING AND METHOD FOR PREPARATION OF THE SAME

FIELD OF THE INVENTION

This invention relates to investment casting, and more particularly relates to an acid soluble core for use in investment casting procedures and to a method of preparation for such cores.

BACKGROUND OF THE INVENTION

Various forms of cores for use in investment casting have been proposed in the prior art. Generally speaking in the investment cores comprise an organic vehicle such as a wax which can be extruded, pressed or injected into various shapes using mold dies. The organic vehicle further includes dispersed therein refractory compounds as well as binders. Once the composition is molded into a desired shape for the eventual cast, the same is fired and cured. The subsequently fired core is then used in the investment casting process to hollow out a particular casting cavity.

The core composition is removed by various means such as water blasting chemical means via acid solution, as well as by autoclaving. The prior art has indicated various solutions to dissolve cores, typical of which is evinced in U.S. Pat. No. 4,922,991. This reference teaches a composite core which includes a water soluble aggregation and an insoluble binder. The aggregation comprises sucrose articles and the binder a phenolic resin. This reference does not teach an acid soluble binder and further is deficient in terms of providing a high percentage core composition incorporating a nitride silicone compound or an aluminum nitride compound.

U.S. Pat. No. 4,925,492, sets forth a ceramic core composition in which the mix for the core includes sodium chloride, fused silica, zircon and temporary binders to facilitate moldability of the mix. Similar to the '991 reference, this document does not teach a mix having a high percentage of binder material to thereby permit rapid removal of the core from the casting subsequent to the firing procedure. In addition, the same does not provide an acid soluble binder.

U.S. Pat. No. 4,530,722, relates to a binder based refractory composition for use in various casting procedures. This reference is primarily directed to a binder and not specifically to a core composition. Accordingly, the reference does not contemplate nor teach a core mix having a high content of binder material.

SUMMARY OF THE INVENTION

In view of the deficiencies in the prior art in terms of providing an adequate mechanically stable core for investment casting procedures which permits rapid removal of the binder material from the core, there exist a need for improvements in core technology and as such, it is an object of the present invention to provide a core for investment casting comprising: a minor amount of an acid soluble mineral binder; and a major amount of a refractory silicon containing filler.

It is a further object of the present invention to provide a core which includes materials soluble with a mild and environmentally friendly acid.

A still further object of the present invention is to provide a refractory ceramic composition for use in the core which has a coefficient of thermal expansion approximately that of investment casting molds.

A further object of the present invention is to employ acids which provide rapid leaching time for the core.

In a preferred form, the silicon refractory comprises a silicon nitride compound and more particularly, $Si_3N_4$.

Other related silicon compounds e.g. silicon carbide (SiC) may be employed in the present such as will be readily apparent to those skilled in the art. The results obtained by employing the silicon nitride have resulted in a core having outstanding mechanical properties when the refractory content is in the concentration ranges indicated.

In terms of the aluminum compounds, it is preferred that the aluminum refractory comprise an aluminum nitride compound and more particularly, AlN.

The binder materials suitable for use in the present invention include the mineral binders, i.e. the alkaline earth binders. Particularly preferred minerals include both calcium borate and magnesium borate. The mineral binders are very useful since removal from various alloy castings is readily achieved.

The preferred acids to solvate the binder include nitric, formic, sulfamic and acetic acids. Most desirably, nitric acid in a concentration of about 36% by volume is employed since the same provides a rapid leaching time thus expediting the overall process.

A further object of the present invention is to provide a method for preparing an acid soluble core for use in investment casting, comprising the steps of: providing a green mix comprising a minor mount of an acid soluble binder, a major amount of a period three nitride refractory compound and a suitable amount of carrier material; extruding the mix into a desired core shape; and heating the core shape to cure the mix.

In order to further enhance the leach time, applicant has found that additives to the core may be included such as calcium carbonate and/or starch.

Although a core mix and core resulting therefrom for investment casting will specifically be addressed herein, it will be appreciate by those skilled in the art that routine parameter optimization will permit the invention to be applied to lost foam, dye and permanent mold applications.

Having thus generally described the invention, reference will now be made to the accompanying drawings, illustrating preferred embodiments.

BRIEF DESCRIPTION OF THE DRAWINGS

FIG. 6 is a graphical representation of thermal expansion data over a variety of temperatures for different core mixes; and FIG. 7 is a graphical representation of thermal expansion data comparing a binder doped core with a core without binder.

DETAILED DESCRIPTION OF THE PREFERRED EMBODIMENTS

Generally speaking, more desirable characteristics for the core include the following:
i) the core should have a modulus of rupture sufficiently high to withstand injection molding of the wax model;
ii) the core should include an open porous network with a void fraction of at least 20% in order to aid and expedite removal of the core;
iii) the strength should be sufficient to maintain the integrity of the core at high temperatures such as is encountered during sintering and casting;
iv) the core body should have a coefficient of thermal expansion which approximates that of investment casting molds; and
v) the core should be easily removable from the cast piece to thereby avoid undue production costs.

The present invention provides a core composition which meets and exceeds the above-described properties.

It has been found that the use of acid soluble binders in combination with refractory fillers in a specified percentage results in a structurally sound core which does not leave any surface roughness on the cast piece.

Figure 1:
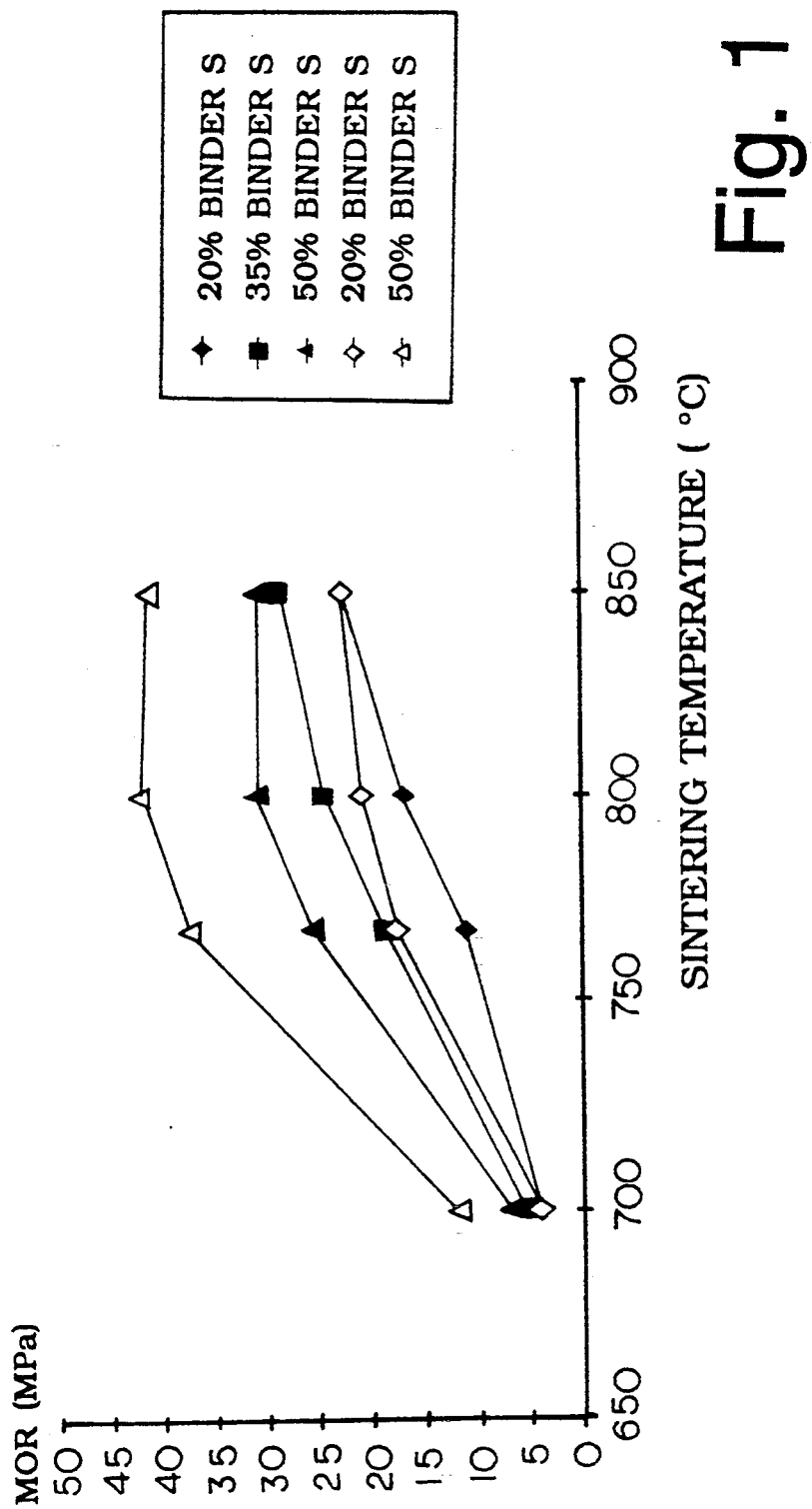
FIG. 1 is a graphical representation of the modulus of rupture as a function of sintering temperature for $Si_3N_4$ based cores and AlN based cores.

An illustration of the effectiveness of the core composition according to the present invention, is shown in FIG. 1. The data tabulated in FIG. 1 was generated by the three point bending test using a bar shaped sample and as a standard ISO 3325.

As is illustrated, the fired core containing either the silicon nitride or aluminum nitride refractory and having from 20% to 50% binder content provides the required mechanical strength over a variety of sintering temperatures. As such, the designer is free to choose binder/refractory concentration ranges to meet specific strength requirements. In addition, since the binder content can be as high as 50% of the core, removal of the core is greatly simplified thus obviating the more complex and expensive techniques presently used.

Referring now to FIGS. 2 through 5, data are shown depicting the efficacy of different types of acids for leaching time of the core.

For this data, a bar sample was immersed in a beaker of the acid. While immersed, contents of beaker was heated to 80° C. and stirred. The weight loss expressed as a percentage was observed and the time for 100% weight loss recorded.

Figure 2:
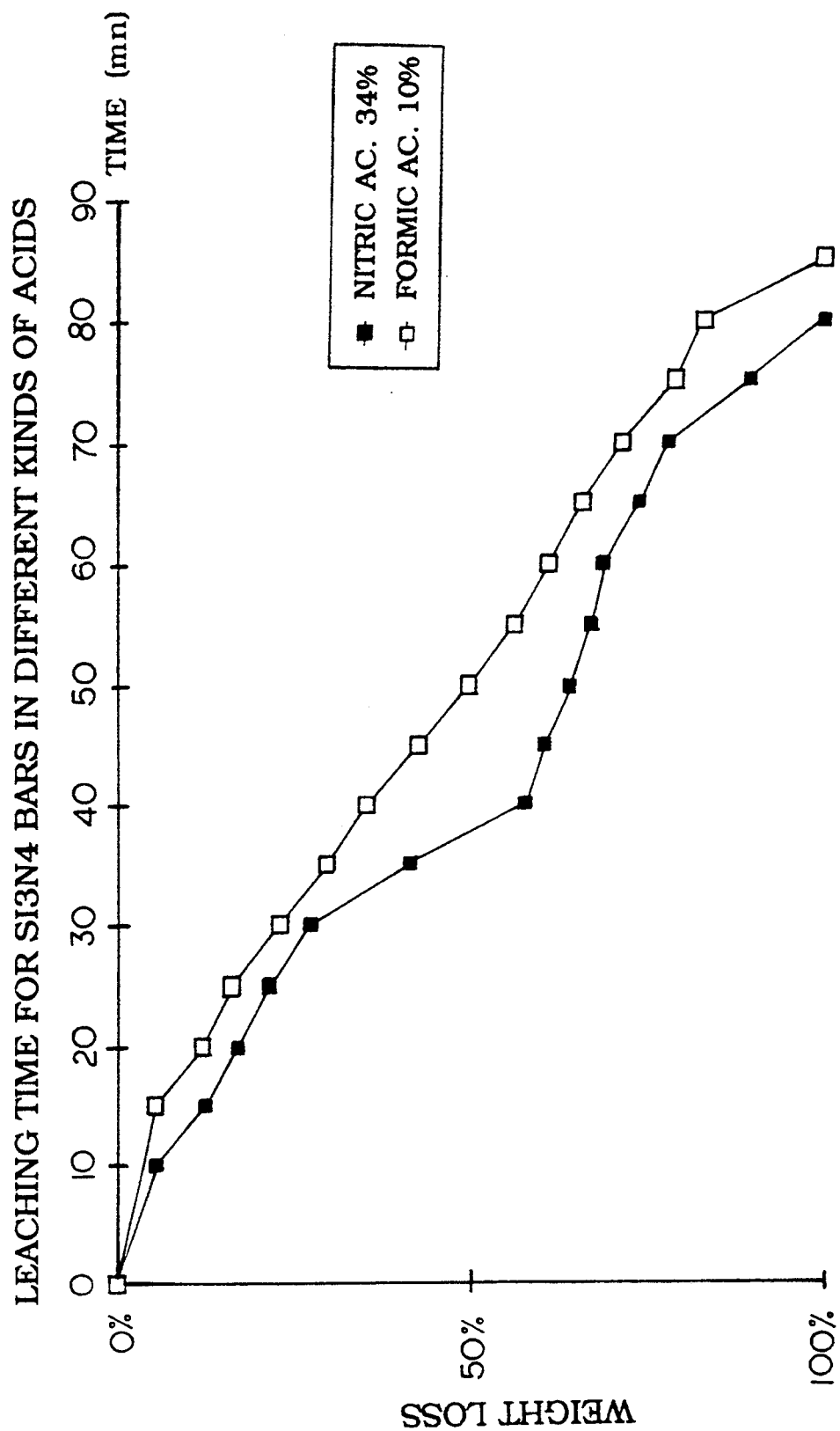
FIG. 2 is a graphical representation of weight loss as a function of leaching time for $Si_3N_4$ based cores.

FIG. 2 graphically illustrates the leachability speed for a silicon nitride ($Si_3N_4$) bar having a volume of 1800 $cm^3$ in nitric acid (34% v/v) and formic acid (10% v/v).

As is illustrated, a 100% binder weight loss was observed in approximately 80 minutes of leach time using nitric acid, while the same weight loss required approximately 85 minutes using formic acid.

Figure 3:
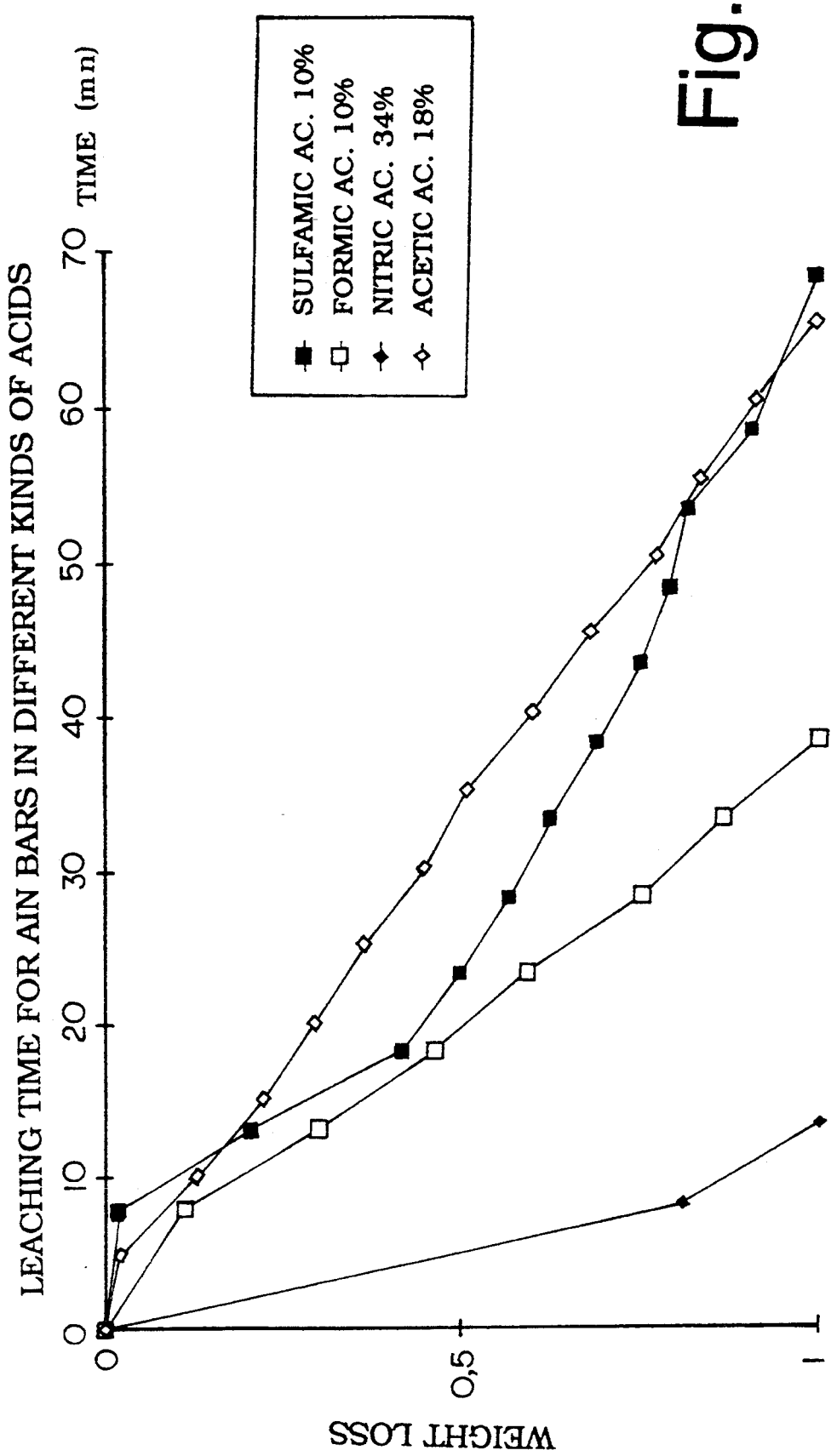
FIG. 3 is a graphical representation of weight loss as a function of leaching time for AlN based cores.

With the above data as a preliminary experimental foundation, further data was generated using different acids for an examination on leaching speed for aluminum nitride loss. FIG. 3 illustrates the findings.

As is clearly evident from FIG. 3, outstanding leaching speed was observed when nitric acid (34% v/v) was employed, a leaching time of approximately 14 minutes was observed. As a further benefit of the leaching speed, no chemical attack was observed on the casting.

Further acids which displayed ability for leaching were fumaric acid (10% v/v) at approximately 37 minutes, acetic acid 18% v/v at approximately 65 minutes, and sulfamic acid 10% v/v at approximately 69 minutes.

Figure 4:
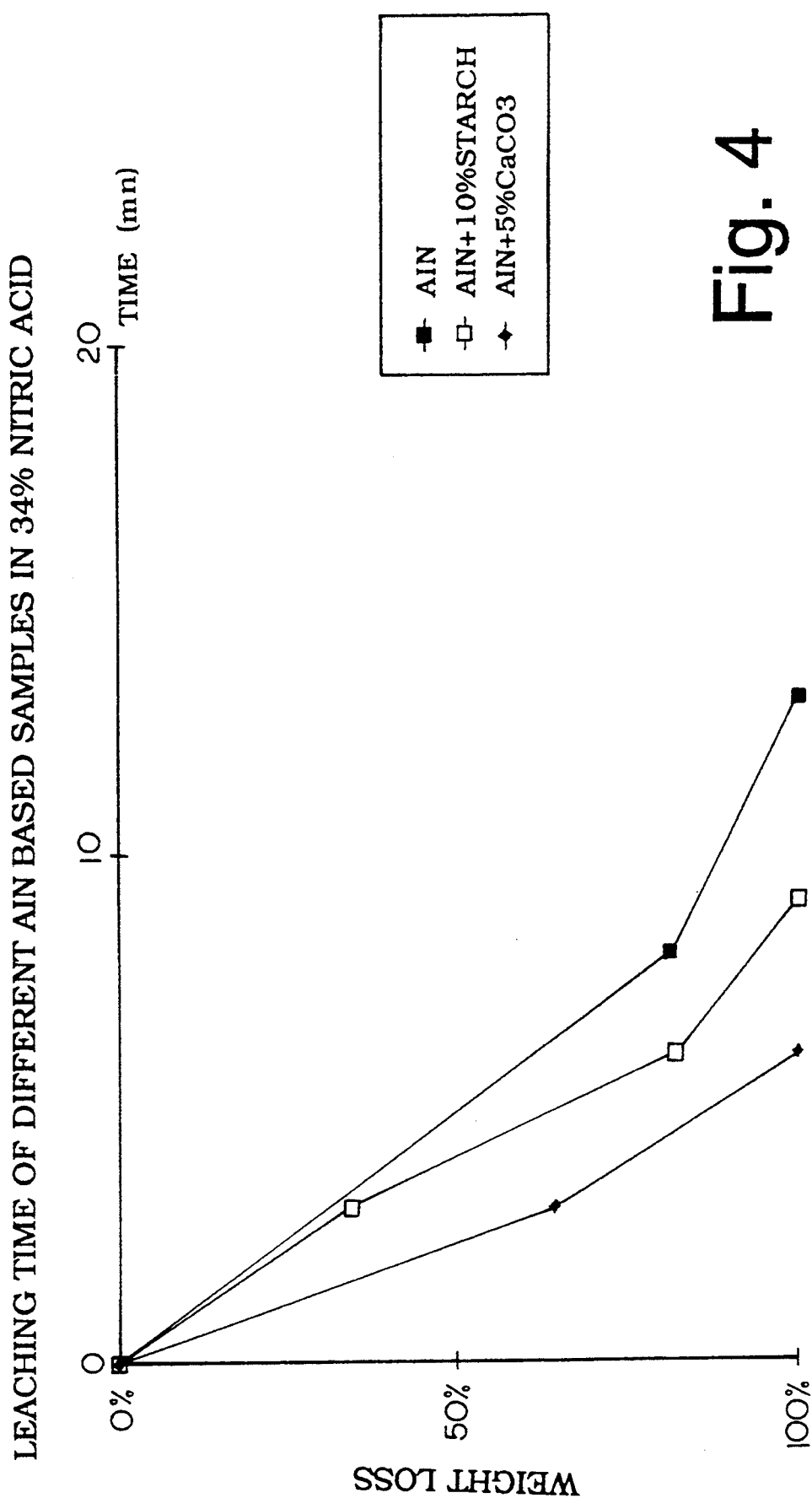
FIG. 4 is a graphical representation of weight loss as a function of leaching time for AlN based core in 34% nitric acid.

Turning to FIG. 4, data are illustrated illustrating the effect of employing additives with the binder for leaching speed. The additives used were 10% by weight starch and a 5% by weight concentration of calcium carbonate ($CaCO_3$). The binder for an aluminum nitride sample, with no additive in 35% v/v nitric acid required approximately 14 minutes to obtain 100% binder weight loss.

Use of the 10% starch compound resulted in the sample incurring a 100% binder weight loss in approximately 9 minutes. The calcium carbonate doped binder proved to provide exemplary results with 100% leachability in slightly over 6 minutes of exposure time.

Figure 5:
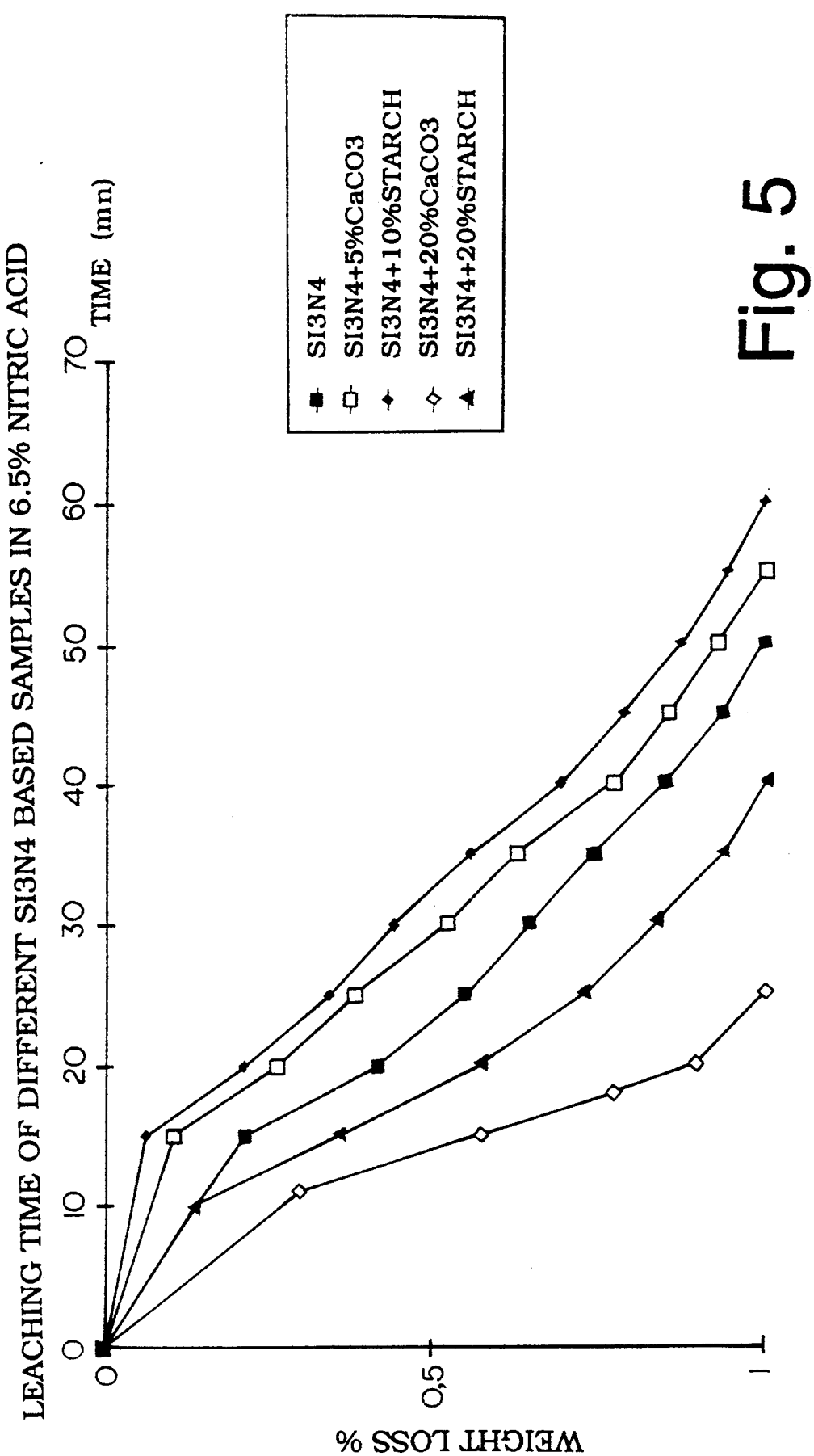
FIG. 5 is a graphical representation of weight loss as a function of leaching time for an $Si_3N_4$ based core in 6.5% nitric acid.

Similar data was generated for the silica nitride based samples as illustrated in FIG. 5.

The data illustrate that the use of starch by weight of the binder for a core containing silica hybrid has a rapid leach time (approximately 27 minutes) in a low concentration (6.5%) nitric acid.

The above data illustrate that a particularly effective core can be fabricated for investment casting which contains environmentally friendly binder compounds which are readily soluble in mild acids in relatively low concentrations.

Referring now to FIG. 6, shown are thermal expansion data for different core types over a variety of temperatures. As is illustrated, the core compositions including the mineral binder employed in the present invention all provide a coefficient of thermal expansion similar to mold materials commonly used in investment casting.

Further results to illustrate the usefulness of the binder—refractory core composition according to the present invention are illustrated in FIG. 7.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A fired ceramic core for use in investment casting comprising:
    an alkaline earth borate binder which is acid soluble in an amount from between about 20% to about 50% by weight of said core; and
    a refractory silicon nitride and/or silicon carbide containing filler in an amount from between about 50% to about 80% by weight of said core.

2. The ceramic core as defined in claim 1, wherein said alkaline earth borate comprises calcium borate.

3. The ceramic core as defined in claim 1, wherein said alkaline earth borate comprises a magnesium borate.

4. A fired ceramic core for use in investment casting comprising:
    an alkaline earth borate binder which is acid soluble; and
    a refractory aluminum nitride containing filler in an amount from between about 50% to about 80% by weight of said core.

5. The ceramic core as defined in claim 4, wherein said alkaline earth borate comprises calcium borate.

6. The ceramic core as defined in claim 4, wherein said alkaline earth borate comprises a magnesium borate.

7. A green mix for preparing a fired acid soluble ceramic core for investment casting comprising:
   an alkaline earth borate acid soluble binder in an amount from about 20% to about 50% by weight of said mix;
   a refractory filler selected from the group consisting of silicon nitride, silicon carbide and aluminum nitride present in an amount from about 50% to about 80% by weight of said mix; and
   a carrier material.

8. The mix as defined in claim 7 wherein said refractory filler comprises silicon nitride filler.

9. The mix as defined in claim 7 wherein said refractory filler comprises aluminum nitride filler.

* * * * *